United States Patent [19]

Lawlor et al.

[11] Patent Number: 5,353,059
[45] Date of Patent: Oct. 4, 1994

[54] DATA ERROR CONCEALMENT

[75] Inventors: Robert J. D. Lawlor, Stillorgan, Ireland; James H. Wilkinson, Tadley, United Kingdom

[73] Assignee: Sony United Kingdom Ltd., Staines, United Kingdom

[21] Appl. No.: 977,251

[22] Filed: Nov. 16, 1992

[30] Foreign Application Priority Data

Jan. 9, 1992 [GB] United Kingdom ............ 9200433.2

[51] Int. Cl.⁵ .............................................. H04N 7/137
[52] U.S. Cl. ................................... 348/398; 348/400; 348/607; 348/616; 358/336
[58] Field of Search ............... 358/133, 136, 167, 336; 348/398, 400, 409, 607, 616; H04N 133, 137

[56] References Cited

U.S. PATENT DOCUMENTS

| | | | |
|---|---|---|---|
| 4,792,953 | 12/1988 | Pasdera | 358/336 |
| 5,003,541 | 3/1991 | Mester | 358/336 |
| 5,122,875 | 6/1992 | Raychaudhuri | 358/136 |
| 5,247,363 | 9/1993 | Sun | 358/167 |

*Primary Examiner*—Howard W. Britton
*Attorney, Agent, or Firm*—William S. Frommer; Alvin Sinderbrand

[57] ABSTRACT

Error concealment apparatus for concealing corrupted data elements in frequency separated digital image data (such as sub-band coded image data) is described. Depending on the spatial frequency represented by a corrupted data element, one of a number of error concealment means is selected to conceal the error. In this way the error concealment used can be tailored to suit the different properties of the various spatial frequency components in the frequency separated image.

27 Claims, 12 Drawing Sheets

| Sub-band category | DC horizontal & vertical DC | Horizontal DC | Vertical DC | Low order AC | High order AC |
|---|---|---|---|---|---|
| Sub-band numbers | 0 | 8,16,24,32,40 48,56 | 1,2,3,4,5,6,7 | 9-15,17-23,25-30, 33-38,41-46, 49-53,57-60 | 31, 39, 47, 54, 55, 61, 62, 63 |
| | Frame concealment | Frame concealment | Frame concealment | Frame concealment | Frame concealment |
| | Type A spatial concealment | Horizontal concealment | Vertical concealment | Zero substitution | Zero substitution |
| | Type B spatial concealment | Spatial replacement | Horizontal concealment | Frame replacement | |
| | Horizontal concealment | Frame replacement | Spatial replacement | | |
| | Vertical concealment | | Frame replacement | | |
| | Spatial replacement | | | | |
| | Previous frame replacement | | | | |

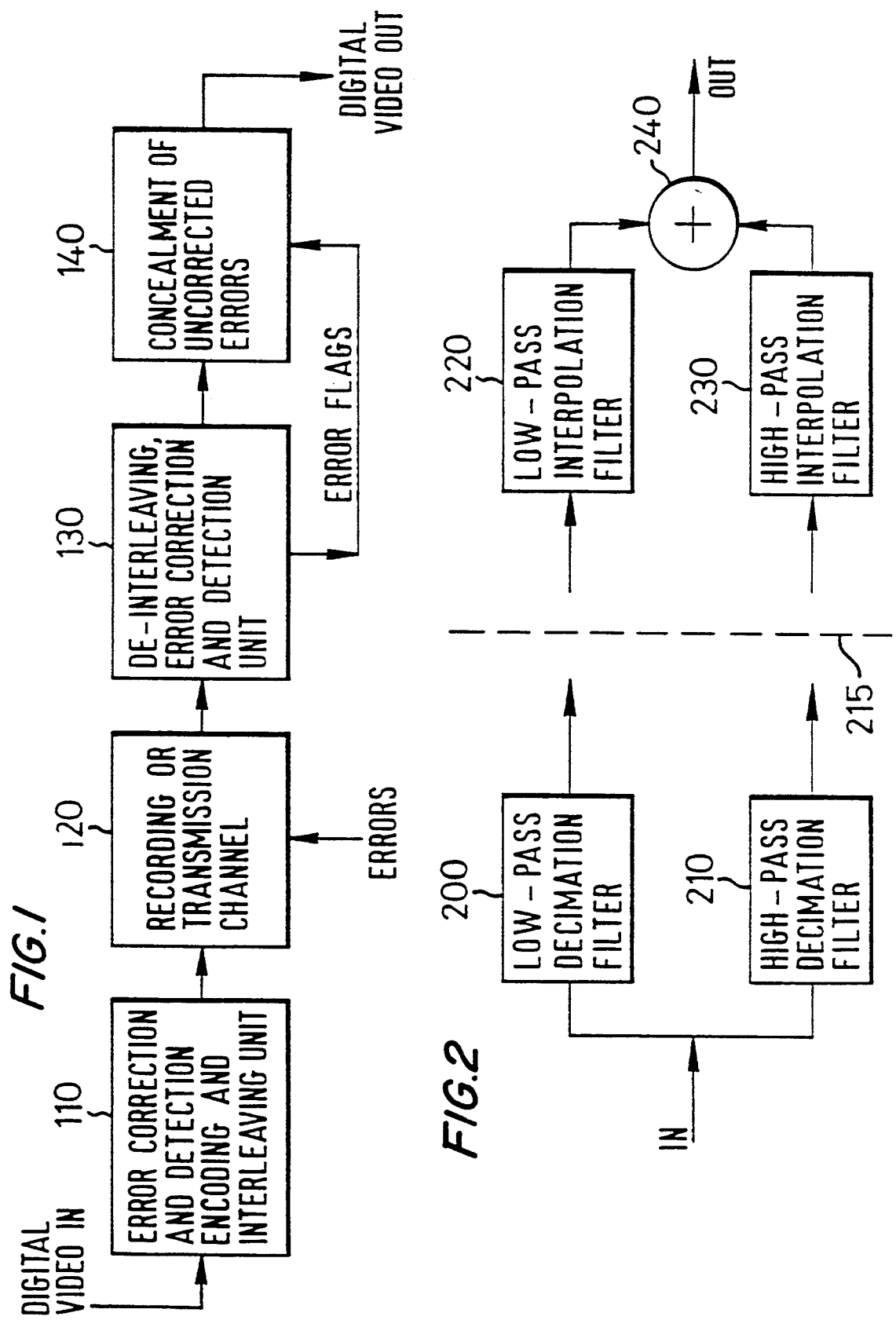

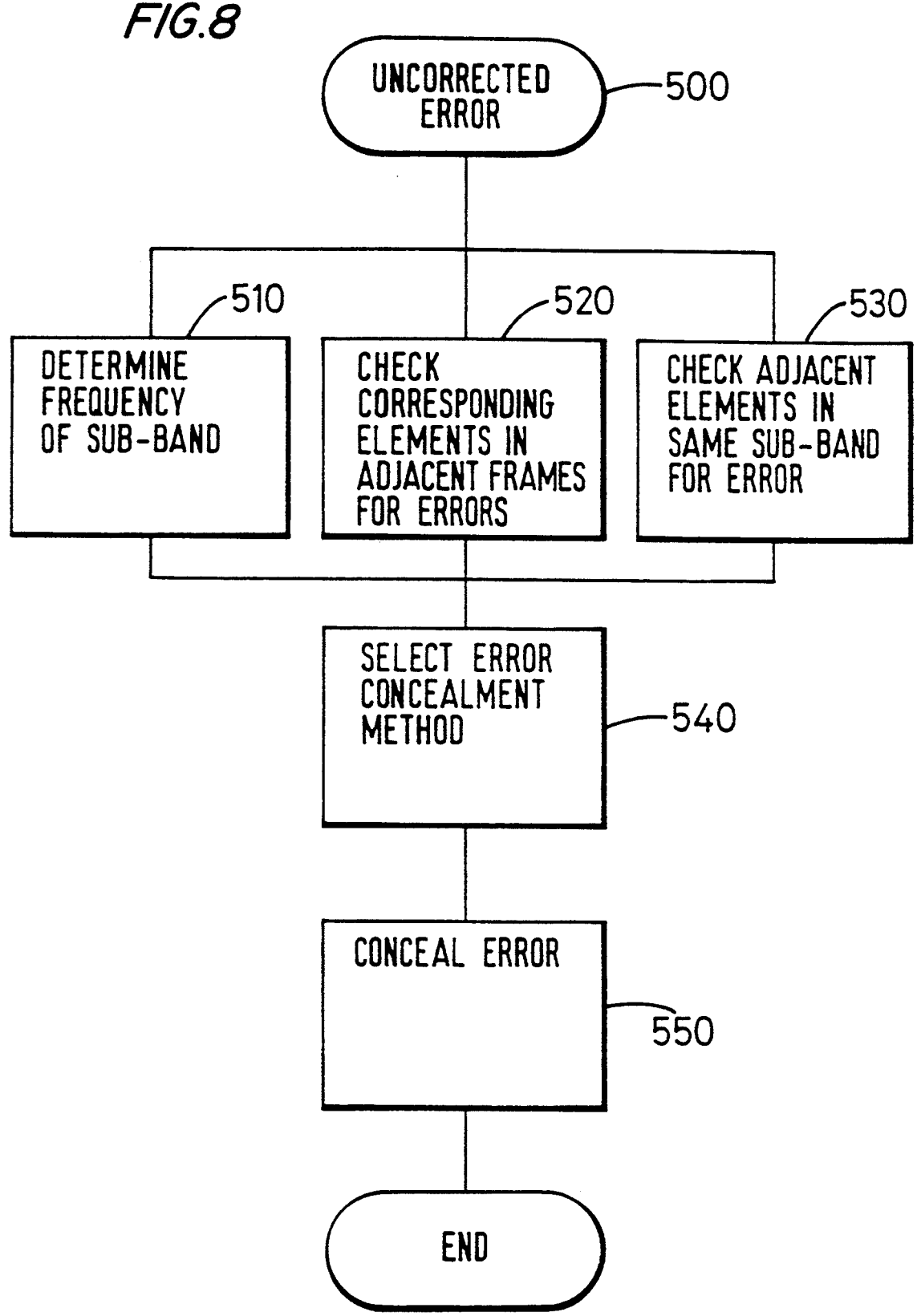

FIG. 9

| Sub-band category | DC horizontal & vertical DC | Horizontal DC | Vertical DC | Low order AC | High order AC |
|---|---|---|---|---|---|
| Sub-band numbers | 0 | 8,16,24,32,40,48,56 | 1,2,3,4,5,6,7 | 9-15,17-23,25-30,33-38,41-46,49-53,57-60 | 31,39,47,54,55,61,62,63 |
| | Frame concealment | Frame concealment | Frame concealment | Frame concealment | Frame concealment |
| | Type A spatial concealment | Horizontal concealment | Vertical concealment | Zero substitution | Zero substitution |
| | Type B spatial concealment | Spatial replacement | Horizontal concealment | Frame replacement | |
| | Horizontal concealment | Frame replacement | Spatial replacement | | |
| | Vertical concealment | | Frame replacement | | |
| | Spatial replacement | | | | |
| | Previous frame replacement | | | | |

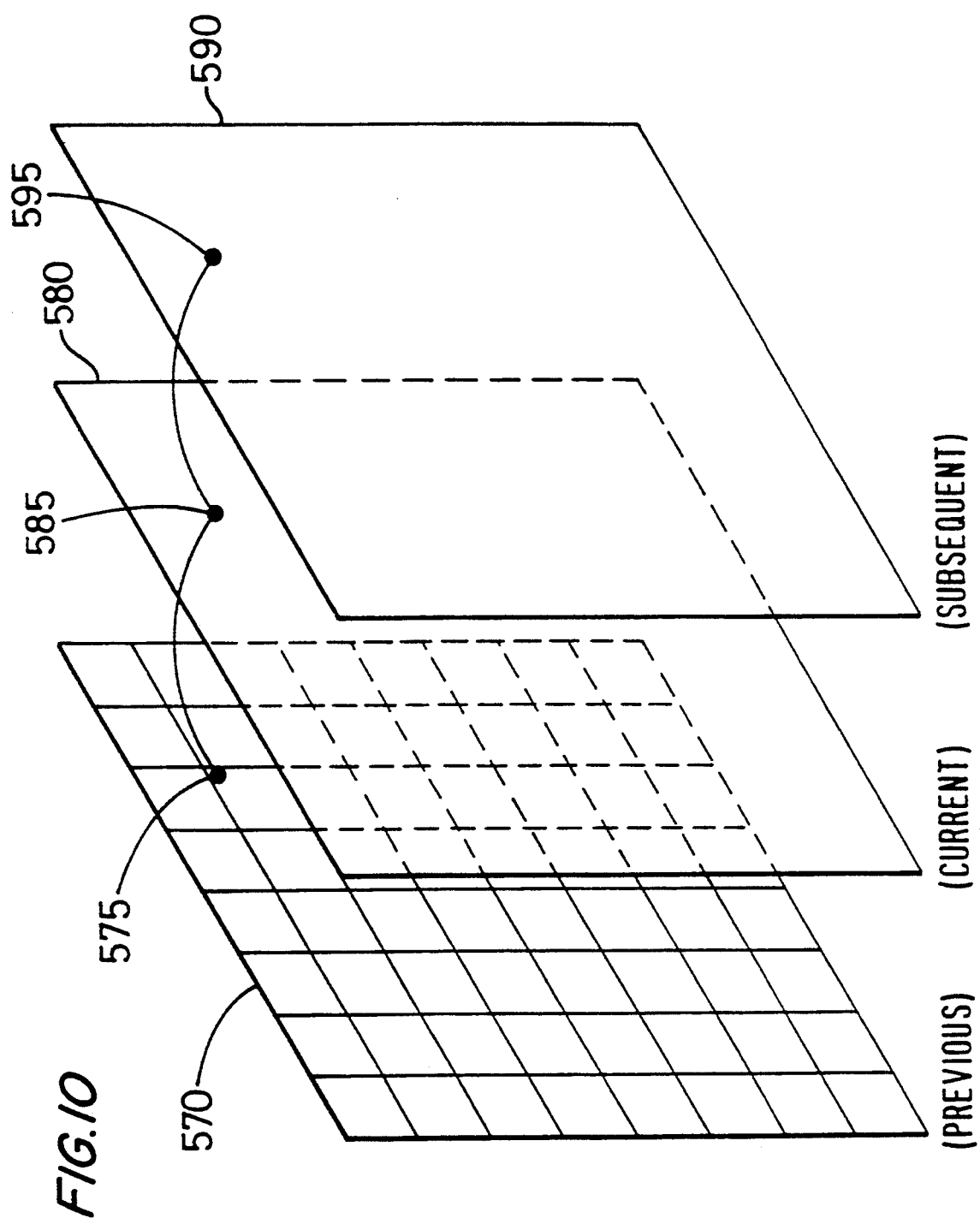

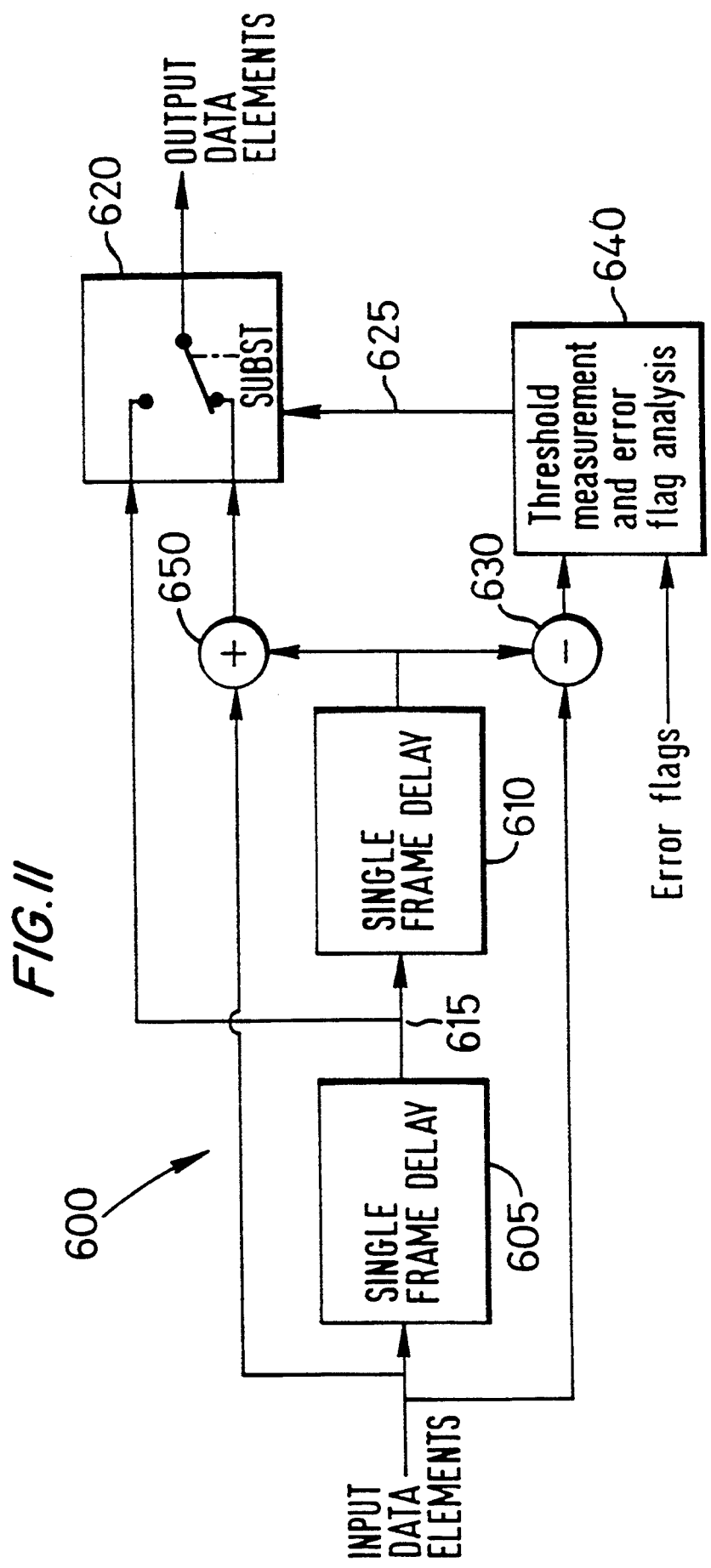

DATA ERROR CONCEALMENT

BACKGROUND OF THE INVENTION

1. Field of the Invention

This invention relates to the field of data error concealment.

2. Description of the Prior Art

When digital image or video data is recorded or transmitted it can be corrupted by data errors. For example, portions of data recorded on and then replayed from a magnetic medium may suffer errors due to medium defects or dirt particles on the medium's surface. As video data is usually processed in real time, it is not generally possible to re-read or re-transmit the corrupted data.

To counter this problem it is known to encode data before recording or transmission using error correcting codes. This involves adding extra digital information, derived from the data, to form a composite data stream. The additional information is such that certain errors in the original data can be detected and the correct value of the data element in error calculated and reinserted. However, when an error correcting code is used, a balance must be struck between the requirement to be able to correct commonly occurring errors and the increased redundancy or data overhead caused by adding the error correcting capability. This generally places an upper limit on the length or frequency of data errors which can be completely corrected, although the system may allow the presence of more serious, uncorrectable, errors to be detected.

In contrast to an analogue system in which steadily increasing degradation generally has a steadily worsening effect on a video signal, if the degradation of a digitised image or video data stream exceeds the threshold at which the errors can be corrected, then the effect on the picture reconstructed from the data can be sudden and subjectively very noticeable. In order to reduce this problem it is known to use error concealment to mask the subjective effect of uncorrectable data errors on the reconstructed picture.

Error concealment in these extreme situations exploits the inherent redundancy present in digitised images or video signals, in that an attempt is made to estimate or interpolate a replacement value for a picture element (pixel) from surrounding pixels in the same picture or from corresponding pixels in previous and subsequent frames. If this is not possible because the surrounding pixels have themselves suffered data errors, then a last resort approach may be to re-use corresponding pixels from an earlier frame to conceal the missing pixels. An example of an error correction and concealment system is that used in the D1 Digital Video Tape Recorder, described in the book 'Introduction to the 4:2:2 Digital Video Tape Recorder' (S. Gregory, Pentech Press, 1988).

A recently adopted signal processing technique is to decorrelate digital image or video data into respective frequency components in the two-dimensional spatial frequency domain. This technique has a number of advantages, particularly relating to the ease with which the resulting data can be compressed for storage or transmission.

SUMMARY OF THE INVENTION

It is an object of the invention to improve the performance of error concealment systems and thereby reduce the impact of data errors upon the quality of an image reproduced from the digital image data.

Viewed from one aspect this invention provides error concealment apparatus for concealing corrupted data elements in digital image data comprising a plurality of elements representing respective spatial frequency components of a frequency separated image in the two-dimensional spatial frequency domain, said error concealment apparatus comprising:

(i) a plurality of error concealment means; and
(ii) selecting means for selecting one of said error concealment means to conceal one of said corrupted data elements according to said spatial frequency component represented by said corrupted element.

This invention recognises that the data within the different frequency components of a frequency separated image have characteristics that are shared within components but vary considerably between components and accordingly no one error concealment technique is suited to all components. This invention turns this potential problem into an advantage by providing a plurality of error concealment techniques which are switched into and out of operation to match the component currently being processed. In this way improved concealment performance can be achieved.

Although the invention is applicable to error concealment in any image data which has been frequency separated, for example by use of the discrete cosine transform (DCT), the invention is particularly suitable for use when the digital image data represents respective sub-bands of the image in the two-dimensional spatial frequency domain, in which case the selecting means selects one of the error concealment means to conceal a corrupted data element according to the spatial frequency range of the sub-band containing the corrupted element.

Although the invention is suitable for use with digital image data representing still pictures, it is particularly applicable to the case in which the digital image data comprises a series of frames of data representing respective successive frames of a video signal.

One type of preferred error concealment means comprises frame concealment means for interpolating a replacement value for a corrupted data element from corresponding elements in frames adjacent to the frame containing the corrupted element. However, if there has been substantial image motion between the previous and subsequent frames used by the frame concealment means the replacement value may be a poor concealment of the error. It is therefore preferred that the frame concealment means should further comprise means for calculating a difference value representing the numerical difference between the values of the corresponding elements in the adjacent frames, and means for preventing operation of the frame concealment means if the difference value is greater than a predetermined threshold. If the difference value exceeds the threshold then it is likely that there has been sufficient inter-frame image motion to render frame concealment inappropriate.

Because the properties of the various frequency components, and their sensitivities to inter-frame motion, differ, it is preferred that the predetermined threshold varies according to the spatial frequency represented by the corrupted element.

Another preferred type of error concealment means comprises two-dimensional spatial concealment means for interpolating a replacement value for a corrupted data element from all of the elements adjacent in the two-dimensional spatial frequency domain to the corrupted element in the frequency separated image data. However, if the elements diagonally adjacent to the corrupted element are themselves in error it is preferred to use second two-dimensional spatial concealment means for interpolating a replacement value for a corrupted data element from elements which are horizontally adjacent in the two-dimensional spatial frequency domain and elements which are vertically adjacent in the two-dimensional spatial frequency domain to the corrupted element in the frequency separated image data.

It is not necessary for the 'adjacent' data elements referred to above to be adjacent in the data stream received by the error concealment apparatus, but instead they are to be considered as being adjacent in the image data as it would be ordered in the two-dimensional spatial frequency domain.

In conventional video the horizontal direction will be the direction of line scanning of the video images, and the vertical direction will be substantially perpendicular, in the plane of the image, to the direction of line scanning.

A further type of preferred error concealment means comprises vertical spatial concealment means for interpolating a replacement value for a corrupted data element from elements vertically adjacent in the two-dimensional spatial frequency domain to the corrupted element in the frequency separated image data. Similarly, it is preferred that one of the error concealment means comprises horizontal spatial concealment means for interpolating a replacement value for a corrupted data element from elements horizontally adjacent in the two-dimensional spatial frequency domain to the corrupted element in the frequency separated image data.

If there are insufficient error-free elements adjacent to the corrupted element for interpolation to be performed, it is preferred that spatial replacement means are provided for replacing a corrupted data element by the value of a single other element adjacent in the two-dimensional spatial frequency domain to the corrupted element in the frequency separated image data. If the spatial replacement means are used when more than one of the adjacent elements are error-free, then preferably the corrupted data element should be replaced by an adjacent error-free element which is highest in a predetermined selection order.

A further preferred type of error concealment means comprises frame replacement means for replacing a corrupted data element by the value of the corresponding element in a previous frame.

For some ranges of horizontal and vertical spatial frequencies it may be that the most likely value of the corrupted element is in fact a constant value such as the value representing zero energy at that combination of frequencies. To make use of this feature it is preferred that one of the error concealment means comprises constant substitution means for replacing a corrupted data element by a predetermined constant value.

It is preferred to implement some or all of the spatial concealment means as a single programmable filter means for calculating a replacement value for a corrupted element according to a weighted sum of the values of one or more elements adjacent in the two-dimensional spatial frequency domain to the corrupted element in the frequency separated image data, using one of a plurality of predetermined groups of weighting coefficients, the group being selected in a predetermined manner in response to error flags associated with the adjacent elements.

When spatial concealment or spatial replacement is used, problems may arise if the corrupted element is at an edge or a corner of the frequency separated image data in the two-dimensional spatial frequency domain, in which case certain of the adjacent elements which may be required for interpolation or replacement will be missing. Although it is possible to ignore such a situation on the grounds that the majority of the data will not be at an edge, it is preferred to employ edge detection means for detecting whether a corrupted element is at one or more edges of the frequency separated image data in the two-dimensional spatial frequency domain, whereby only a subset of the adjacent elements is present; and means responsive to the edge detection means for controlling the selected error concealment means to replace the corrupted element with a replacement value dependant on one or more of the subset of adjacent elements. In the case of sub-band coded image data the edge detection means should preferably comprise means for detecting whether a corrupted element is at one or more edges of its respective sub-band in the two-dimensional spatial frequency domain.

In order to tailor the error concealment used to the spatial frequency represented by the corrupted element it is preferable that the selecting means selects one of the error concealment means from a predetermined set of the error concealment means, the set varying according to the spatial frequency represented by the corrupted element. In this way a set can be compiled comprising those of the available error concealment means which are suitable for concealing a corrupted element representing a particular spatial frequency or range of spatial frequencies, with the selecting means selecting only from that set.

The set of the available error concealment means which are suitable for concealing a corrupted element representing a particular spatial frequency or range of spatial frequencies is preferably arranged in a predetermined order of selection, so that the selecting means selects the error concealment means within the set which is highest in a predetermined selection order associated with the set and for which all elements required by the error concealment means to interpolate a replacement value for the corrupted element are error-free. Certain types of error concealment means, such as the constant substitution means, do not require any other elements in order to derive a replacement value for the corrupted element. In these cases it can be taken that all elements required by the error concealment means to interpolate a replacement value for the corrupted element are error-free, so the above condition imposed by the selecting means is automatically satisfied.

The selection order can be set up so that error concealment means having a greater predicted likelihood of success in concealing a corrupted element at the spatial frequency corresponding to that set are placed higher in the selection order. If the error concealment means highest in the list cannot be used because one or more elements from which it would derive a replacement value are themselves corrupted, the next error concealment means in the selection order will be used, and so on.

It would be possible to employ a separate predetermined set of error concealment means, with an associated selection order, for each of the sub-bands in a sub-band coded image. However, in order to simplify the error concealment apparatus it is preferred that sub-bands having similar properties are grouped together to share a predetermined set. This grouping could be arranged in a large number of ways, but a preferred grouping of the sub-bands is given below, along with the members of the corresponding predetermined sets of error concealment means in predetermined selection order:

(a) For the sub-band containing dc horizontal and dc vertical information it is preferred that the set of error concealment means comprises, in the predetermined selection order:
 (1) frame concealment means;
 (2) firstmentioned two-dimensional spatial concealment means;
 (3) second two-dimensional spatial concealment means;
 (4) horizontal spatial concealment means;
 (5) vertical spatial concealment means;
 (6) spatial replacement means; and
 (7) frame replacement means.

(b) For sub-bands containing dc horizontal and ac vertical information it is preferred that the set of error concealment means comprises, in the predetermined selection order:
 (1) frame concealment means;
 (2) horizontal spatial concealment means;
 (3) spatial replacement means; and
 (4) frame replacement means.

(c) For sub-bands containing ac horizontal and dc vertical information it is preferred that the set of error concealment means comprises, in the predetermined selection order:
 (1) frame concealment means;
 (2) vertical spatial concealment means;
 (3) horizontal spatial concealment means;
 (4) spatial replacement means; and
 (5) frame replacement means.

(d) For sub-bands containing ac horizontal and ac vertical information it is preferred that the set of error concealment means comprises, in the predetermined selection order:
 (1) frame concealment means; and
 (2) constant substitution means;

When sub-band coded image data is recorded or transmitted the high spatial frequency ac sub-bands are often more heavily quantised than other sub-bands and may be treated with the lowest priority if a data compression system outputs too much data to be recorded or transmitted on the available channel. As a result, frame replacement may be unsatisfactory for these high frequency sub-bands, because the previous frame information may itself be unsatisfactory. It is therefore preferred that only in the case of an ac sub-band containing ac horizontal information below a predetermined horizontal spatial frequency and ac vertical information below a predetermined vertical spatial frequency the set of error concealment means should also comprise:
 (3) frame replacement means;
the frame concealment means being selected if none of the elements adjacent in the two dimensional spatial frequency domain to the corrupted element in the frequency separated image data is error-free.

The sets and selection orders described above demonstrate how error concealment means which are particularly appropriate to the sub-band containing the corrupted element can be given priority. For example, it has been observed that sub-bands containing dc vertical and ac horizontal information contain mainly vertical features of the original image. To exploit this fact the spatial concealment method highest in the selection order for these sub-bands is vertical spatial concealment. In the same way, the spatial concealment method used for sub-bands containing dc horizontal and ac vertical information is horizontal spatial concealment.

References to sub-bands containing dc information in the horizontal or vertical direction apply to the sub-bands of lowest horizontal or vertical frequency, although in practice these sub-bands do not necessarily represent only the constant portions of the signal with strictly zero frequency in the respective directions.

Viewed from a second aspect the invention provides a method of concealing a corrupted data element in digital image data comprising a plurality of elements representing respective frequency components of a frequency separated image in the two-dimensional spatial frequency domain, said method comprising selecting one of a plurality of error concealment means to conceal said corrupted data element according to said spatial frequency component represent by said corrupted element.

Error concealment apparatus according to the invention is particularly suitable for use in digital video recording/reproducing apparatus or digital video transmission/reception apparatus.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 is a schematic illustration of error correction and concealment apparatus;

FIG. 2 is a schematic illustration of one stage of sub-band coding;

FIG. 8 is a flow chart showing operation of error concealment apparatus for use with sub-band coded video data;

FIG. 9 illustrates the concealment strategies appropriate to the various categories of sub-bands;

FIG. 10 illustrates the use of frame concealment;

FIG. 11 illustrates motion threshold detection and frame concealment apparatus;

DESCRIPTION OF THE PREFERRED EMBODIMENTS

Figure 3:
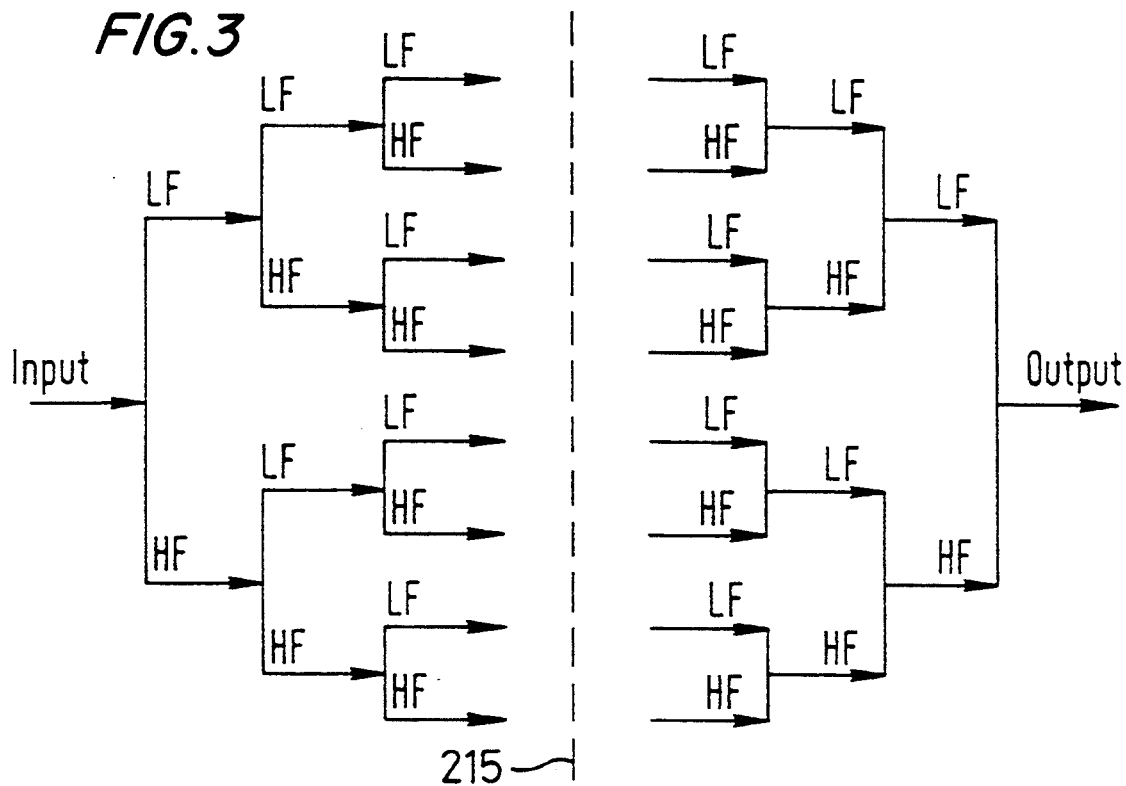
FIG. 3 is a schematic illustration of a higher order sub-band coding system.

Referring now to FIG. 1, apparatus is shown for correcting and concealing corrupted data elements in a digital video signal subject to degradation. Before being recorded or transmitted the digital video signal, which comprises successive digital words representing a scanned image or picture, is applied to an error correction and detection encoding and interleaving unit 110. In the encoding and interleaving unit 110 the digital video signal is encoded in a known manner using an error correction and detection code. This involves mathematically deriving additional digital information from the video data, which can be used later to reconstruct parts of the video data corrupted during recording or transmission. The encoding and later decoding also allows the detection of more serious, uncorrectable, errors.

In the encoding and interleaving unit 110 the encoded data are also interleaved or shuffled so that words representing adjacent picture elements are separated from one another for recording or transmission. In the case in which the data is recorded, the result of interleaving is that adjacent elements in the original image are physically separated from one another on the recording medium, perhaps even being recorded by different record heads in a multi-channel recording system. If the data are to be transmitted the interleaving will mean that adjacent elements in the original image are separated from one another in time. Interleaving is performed to reduce the impact on the image of data burst errors in which a number of consecutively recorded or transmitted data words are corrupted by a single channel error.

The encoded and interleaved signal output by the error correction and detection encoding and interleaving unit 110 is recorded or transmitted via a channel 120, during which process the signal may be corrupted by data errors.

When the signal is received or replayed it is passed first to a de-interleaving and error correction and detection decoding unit 130 where the data are de-interleaved and an attempt is made to correct any data errors suffered by the signal. If any uncorrectable errors are detected, an error flag is set and, in response to the error flag, an error concealment unit 140 applies concealment in order to reduce the subjective effect of these errors on the final reconstructed picture. After error concealment the digital video signal is output by the error concealment unit 140 for further processing.

Error concealment involves replacing a corrupted data element by a concealment value which may be interpolated from surrounding error-free data, or simply estimated. The interleaving of the data as described above assists in the error concealment process, in that elements adjacent to an element corrupted during a burst error will have been separated from the corrupted element during recording or transmission and so will usually not have been affected by that burst error.

The error correction capability of the system is broadly dependent on the degree of interleaving and the complexity of the error correcting codes used. In general, an improvement in the size or frequency of errors which can be corrected will usually means an increase in the redundancy in the coded data. As a result, a balance has to be struck between the desirability of increased error correction and the channel bandwidth penalties such as increase will bring. However, an error correction system is usually specified so as to be capable of correcting most commonly occurring errors, with concealment only being required in extreme error conditions. For example, in the case of error concealment in image data recovered from a helically scanned magnetic tape recording, these extreme conditions may occur during a major tape dropout or during shuttle (high speed) replay, in which only part of the data from each track on the tape will be recovered.

An established technique in digital video signal processing is that of decorrelating an image into frequency separated signal portions representing different components of the image in the two-dimensional spatial frequency domain. This technique has been used in the field of data compression, particularly for recording or transmission, since the high spatial frequency information in the picture can often be encoded to a lower precision without causing substantial subjective effect on the reconstructed picture.

Although it can be advantageous to record or transmit frequency separated signals, concealment of data errors in such signals can be more difficult than the concealment of similar errors in conventionally coded image data. One reason for this difficulty is that adjacent data elements in a frequency separated image are not as closely related as those in the original image and in fact may relate to completely different areas in the original image. Also, conventional spatial concealment relies on the fact that the variation across adjacent pixels in most pictures is small (that is, the energy distribution of most pictures is low at high spatial frequencies), but in the spatial frequency domain of frequency separated images the energy distribution tends to be much more evenly spread. Finally, whereas in conventional spatial concealment a badly concealed error might only affect a small portion of the image, a badly concealed error in the spatial frequency domain can lead to noticeable artifacts spread over a wider area of the reconstructed picture.

In order to explain fully the operation of the present embodiment a description of the decorrelation of a video signal into frequency separated components (in particular, the use of sub-band coding) will first be given with reference to FIGS. 2 to 7. Apparatus for providing error concealment in frequency separated image data will then be described with reference to the remaining figures.

A recently proposed approach to coding in the frequency domain is that of sub-band coding. In this approach a spatial (two-dimensional) sub-band filtering arrangement divides an input video signal into a plurality of uncorrelated sub-bands each containing the spatial frequency content of the image in a respective one of a plurality of areas of a two dimensional frequency plane of the image. Sub-band filtering is believed to provide better decorrelation than other approaches used to achieve frequency separation. Also, unlike transform techniques such as the discrete cosine transform (DCT), there is no restriction to operate on a block by block basis: the sub-band filtering can be applied directly to the video signal.

FIG. 2 illustrates one stage of sub-band coding in which an input video signal is passed through a low pass decimation filter 200 and a high pass decimation filter 210. The resulting two output signals represent different portions of the frequency spectrum of the input signal, and can now be transmitted or stored. The storage or transmission of the sub-band components is illustrated by the dashed line 215 in FIG. 2.

When the sub-band components are received or recovered from the storage or transmission medium 215 they are passed through corresponding matching filters to regenerate the original frequency components. These matching filters are a low pass interpolation filter 220 and a high pass interpolation filter 230. The outputs of the interpolation filters 220, 230 are added by a summation circuit 240 to yield the original video input signal.

FIG. 2 illustrates the decomposition of the input video signal into two sub-bands. However, in practice, the input video signal would be decomposed into many more sub-band components. FIG. 3 illustrates the decomposition of an input video signal into eight sub-band components and its subsequent recombination into an output video signal.

The filters of the sub-band coding system comprise finite impulse response filters with appropriate delays and weighting coefficients to perform both horizontal and vertical frequency decomposition. Different forms of filter for performing sub-band frequency separation are known, e.g. some possible filters are described in the article entitled 'Exact Reconstruction Techniques for Tree Structured Sub-Band Coders', in IEEE Transactions on Acoustics, Speech and Signal Processing, Volume ASSP-34 at pages 434 to 441, June 1986.

Figure 4:
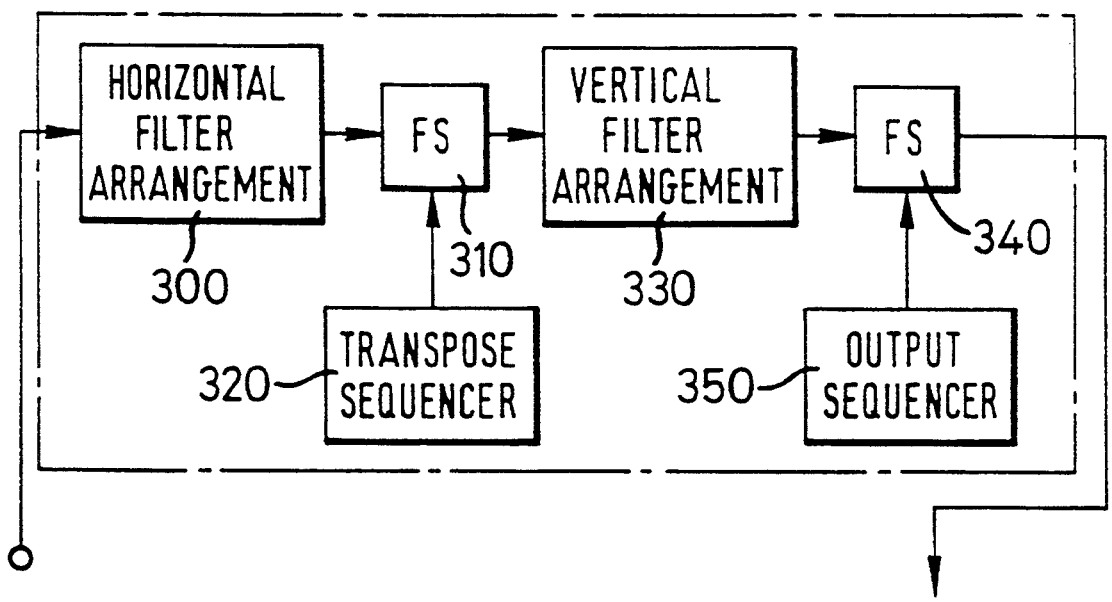
FIG. 4 illustrates a two-dimensional sub-band decorrelator.

FIG. 4 illustrates a two-dimensional decorrelator comprising a horizontal filter arrangement 300, an intermediate field store 310, a transpose sequencer (address generator) 320, a vertical filter arrangement 330, an output field store 340 and an output sequencer (address generator) 350. Sub-band filtering is effected on a separable basis. Thus, in FIG. 4, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 300 and 330 respectively.

The horizontal filter arrangement 300 and the vertical filter arrangement 330 can be of substantially the same construction as one another. Thus, the construction of the horizontal filter arrangement 300 only will be described in detail. The filtering is to achieve 8 sub-bands in each of the horizontal and vertical directions, that is to say that a square array of 64 (8×8)sub-band is to be produced. The 64 sub-bands are to be of equal extent to one another.

The horizontal filter arrangement 300 is preferably of a tree or hierarchical structure as shown in FIG. 3, comprising three successive filter stages. The first stage comprises a low pass filter (LF) and a high pass filter (HF), each of which is followed by a respective decimator (not shown). The LF filter, HF filter and the decimators together make up a quadrature mirror filter (QMF). Each of the filters can be a finite impulse response filter of conventional form. In use, a line of a field of the input digital video signal is applied, sample-by-sample, to the first stage, to be low pass filtered and high pass filtered by the LF and HF respectively. Thus, the LF and HF produce outputs comprising low pass filtered and high pass filtered versions of the input line, respectively, the outputs representing the spatial frequency content of the line in the lower and upper halves of the horizontal spatial frequency range. That is, the first stage divides the input line into two sub-bands in the horizontal direction. The decimators decimate (sub-sample) the respective outputs by a factor of two, whereby the total number of samples output by the decimators (together) is the same as the total number of samples in the line.

The second stage is of similar construction to the first stage, except that there are two QMFs each as in the first stage and the output from each of the decimators of the first stage is passed as an input to a respective one of the two QMFs. Thus, the second stage produces four outputs representing the spatial frequency content of the line in four equal quarters of the horizontal spatial frequency range. That is, the second stage further divides the two sub-bands, into which the input line was divided in the first stage, into four sub-bands in the horizontal direction. The four decimators of the second stage decimate (sub-sample) the respective outputs by a factor of two, whereby the total number of samples outputted by the decimators of the second stage (together) is the same as the total number of samples in the line.

The third stage is of similar construction to the first stage, except that there are four QMFs each as in the first stage and the output from each of the four decimators of the second stage is passed as an input to a respective one of the four QMFs. Thus, the third stage produces eight outputs representing the spatial frequency content of the line in eight equal one-eighths of the horizontal spatial frequency range. That is, the third stage divides the four sub-bands into which the line was previously divided into the required eight sub-bands in the horizontal direction. The eight decimators of the third stage decimate (sub-sample) the respective outputs by a factor of two, whereby the total number of samples outputted by the decimators of the third stage (together) is the same as the total number of samples in the line.

The eight outputs of the third stage, that is of the horizontal filter arrangement 300, are passed to the intermediate field store 310 and stored at positions corresponding to respective one-eights of a first line thereof. The above process of horizontal filtering is then repeated for all of the other lines of the field of the input digital video signal. This results in the intermediate field store 310 containing a version of the field of the input digital video signal that has been filtered into eight sub-bands in the horizontal direction (only). Each line of the field stored in the intermediate field store 310 is divided into eight portions each containing the horizontal spatial frequency information in a respective one of eight sub-bands of the horizontal spatial frequency range of the image that the original field represented. Thus, the horizontally filtered field stored in the intermediate field store 310 can be considered to divided into eight columns.

The horizontally filtered field stored in the intermediate field store 310 is then fed (under the control of the transpose sequencer 320) into the vertical filter arrangement 330, in which it is filtered into eight sub-bands in the vertical direction in similar manner to that in which filtering into eight sub-bands in the horizontal direction was achieved in the horizontal filter arrangement 300. The horizontally and vertically filtered field is fed on a line-by-line basis into the output field store 340 to be passed from there for further processing. The output field store 340 can be considered to have been partitioned into an array of 64 (8×8) storage regions, in each of which a respective one of the 64 sub-bands is stored as an array of data elements.

The transpose sequencer 320 produces read addresses for the intermediate field store 310, to control reading of the contents thereof into the vertical filter arrangement 330, as follows. As will be recalled, the signal as stored in the intermediate field store 310 comprises the lines of the original field, each divided horizontally into eight sub-bands. That is, the signal as stored in the intermediate field store 310 can, as mentioned above, be considered to comprise eight columns. To enable the signal stored in the intermediate field store 310 to be vertically filtered by hardware of the same construction (the vertical filter arrangement 330) used to horizontally filter it, it must be transposed, that is rotated through 90 degrees, as it is read to the vertical filter arrangement 330, so that it comprises eight rows (as opposed to columns). The transpose sequencer 320 addresses the intermediate field store 310 in such a manner as to accomplish this.

The nature of the filtering produced by the combination of the horizontal filter arrangement 300 and the vertical filter arrangement 330 is such that data stored in the output field store 340 is somewhat scrambled and must be re-ordered by the output sequencer 350 before being passed for further processing.

Figure 5:
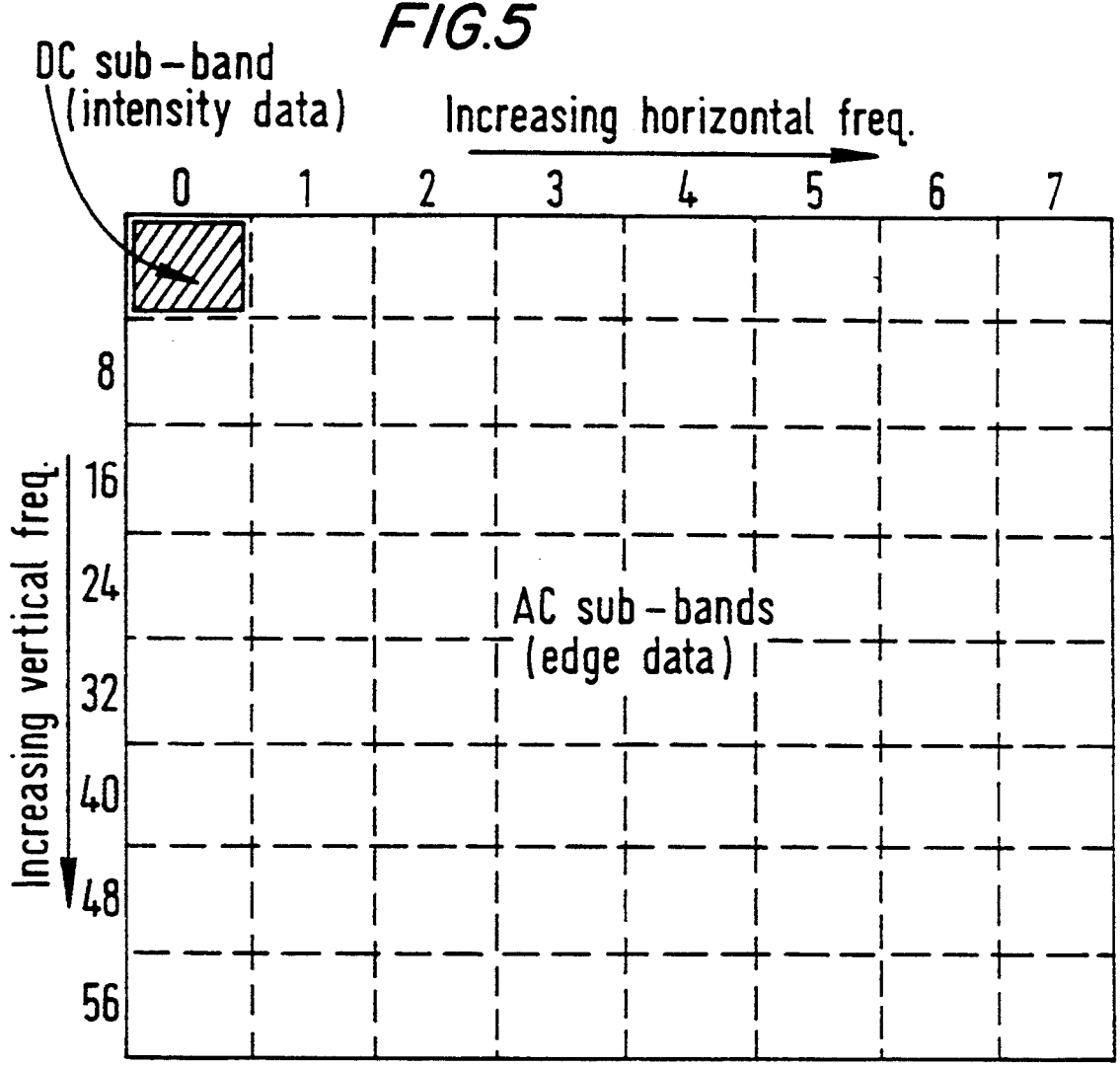
FIG. 5 illustrates a frequency separated video signal.

FIG. 5 illustrates the various sub-band components produced if the input video signal is decomposed both horizontally and vertically into eight frequency components (this can be considered to be the data stored in the output field store 340 after it has had the reordering of the output sequencer 350 applied to it). Each of the sub-bands or sub-pictures is represented by one of the blocks in FIG. 5. The upper left hand block represents the dc sub-band. This is the sub-band of lowest horizontal and vertical frequency although in practice it does not necessarily represent only the constant portions of the signal with strictly zero frequency. This dc sub-band will contain the majority of the dc luminance information of the original video signal. The relative importance of the remaining sub-bands to the eventual perception of the picture by a viewer varies. Generally speaking, the higher frequency sub-bands are less important to the eventual perception of a viewer. In relation to FIG. 5, the frequency which a particular sub-band represents increases in moving downwards and/or rightwards in the array of blocks. The sub-bands are numbered on this and subsequent figures from the top left to the bottom right of the figure. Sub-band 0 is therefore the dc sub-band, sub-bands 1 to 7 are the remaining sub-bands in the top row, and so on.

Figure 6A:
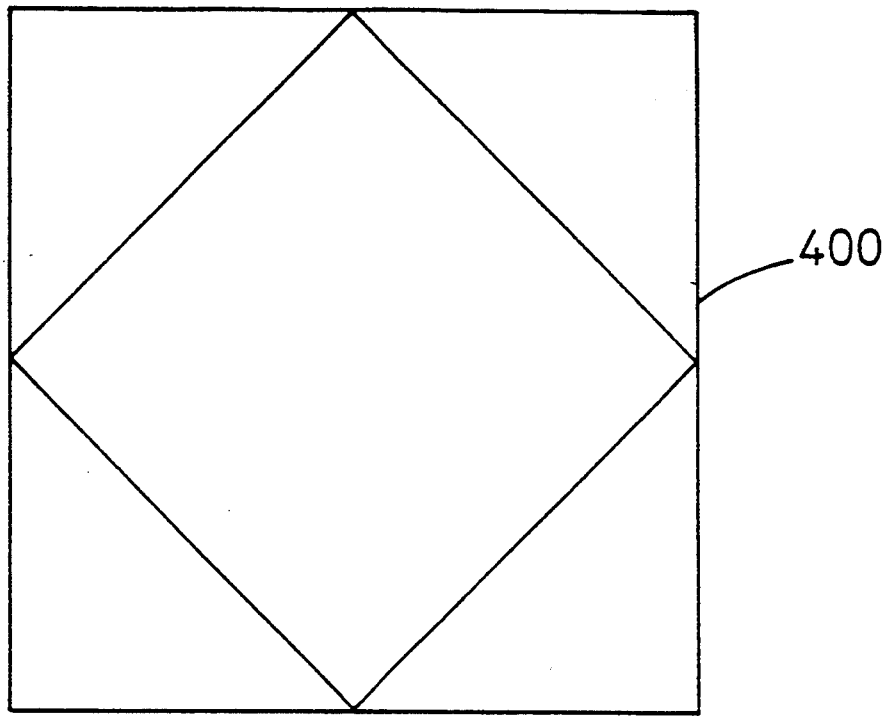
FIGS. 6(a) and 6(b) illustrate the effects of frequency separation on a sample image.
Figure 6B:
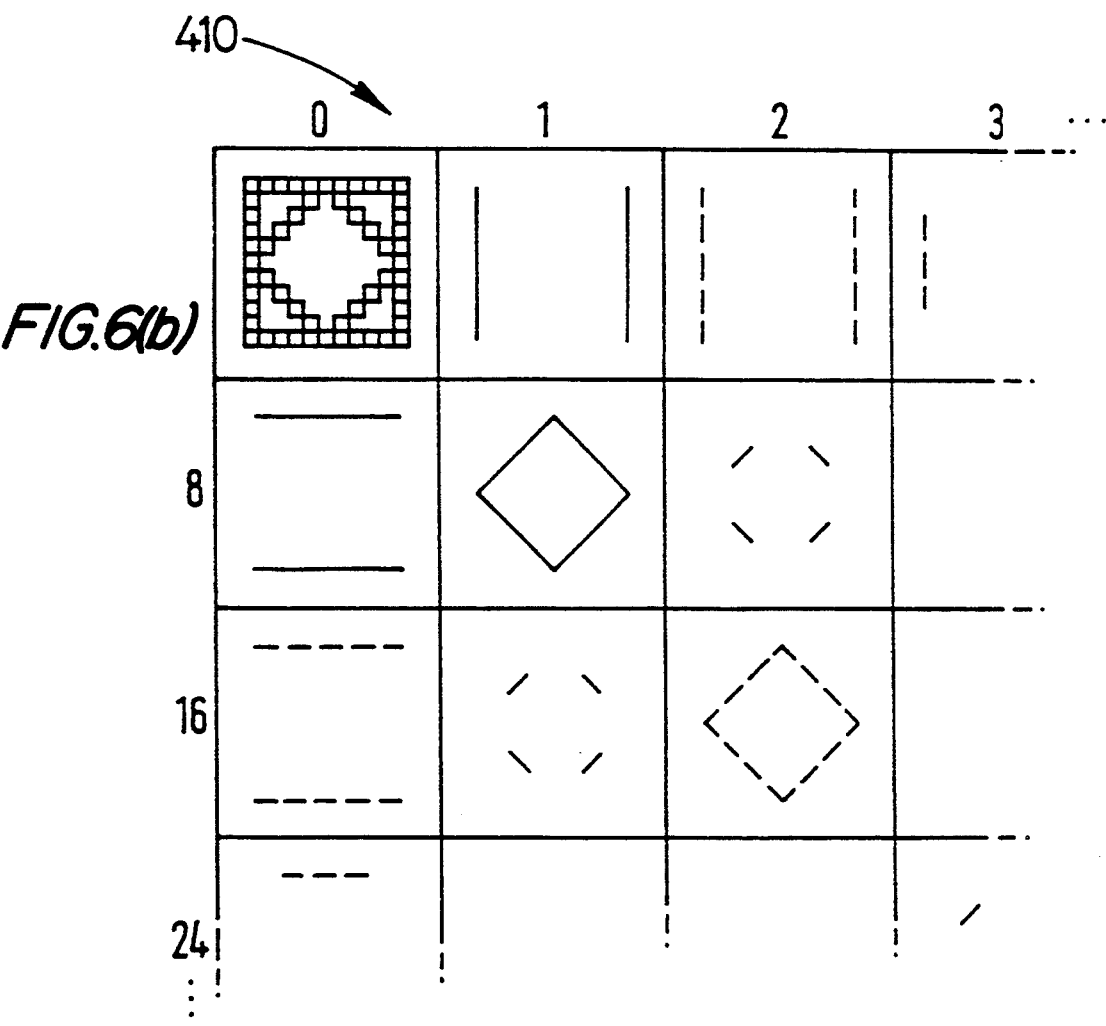

FIGS. 6(a) and 6(b) illustrate the effects of sub-band frequency separation on a sample image 400. The ordering of the sub-bands 410 shown is the same as that used in FIG. 5. In other words, the top left sub-band, sub-band 0, is the dc sub-band representing the lowest horizontal and vertical frequency components of the picture. In practice this dc sub-band often resembles a highly pixelated version of the original picture. The remaining sub-bands in the left-hand column (numbered 8, 16, 24 . . . ) correspond to spatial frequency components in the picture having a low horizontal frequency, and a vertical frequency increasing down the page. Similarly, the remaining sub-bands in the top row (numbered 2, 3, 4 . . . ) represent components having low vertical frequency, and increasing horizontal frequency across the page.

It will be clear from FIGS. 6(a) and 6(b) that the sub-bands in the top row (2, 3, 4 . . . ) tend to contain mainly vertical features, and those in the left-hand column (8, 16, 24 . . . ) tend to contain mostly horizontal features. The remaining sub-bands (the ac sub-bands) tend to contain a mixture of horizontal and vertical information. Also a significant proportion of the ac sub-bands is occupied by zeroes—that is, the content of the corresponding region of the picture at that particular combination of horizontal and vertical frequencies is zero. This fact becomes more noticeable in higher frequency sub-bands.

Figure 7:
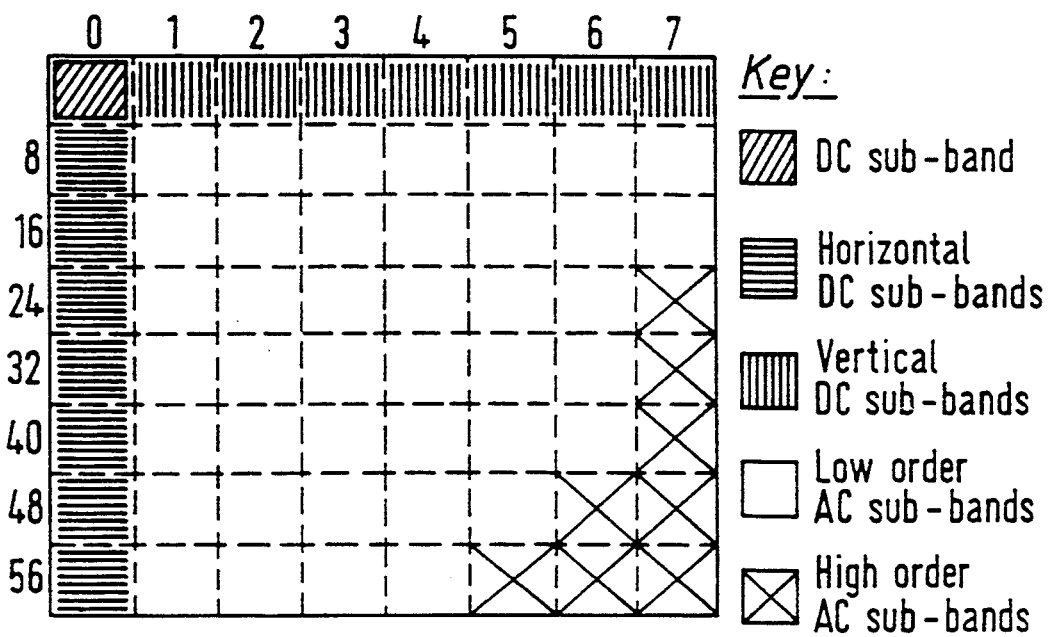
FIG. 7 illustrates the sub-bands categorised according to their horizontal and vertical spatial frequency ranges.

Because the properties of the sub pictures generated by sub-band coding vary according to the frequency range of the sub-band, it has been recognised in the present embodiment that different error concealment strategies are appropriate for the different sub-bands. However, it is not necessary to provide individual concealment strategies for all 64 sub-bands; instead, the sub-bands can be categorised into groups having similar properties. This type of categorisation is shown in FIG. 7 which illustrates the sub-bands broadly categorised according to their vertical and horizontal spatial frequency ranges. Four categories are shown:

a) the dc sub-band;
b) sub-bands containing dc vertical information and ac horizontal information;
c) sub-bands containing ac vertical and dc horizontal information;
d) sub-bands containing low order ac horizontal and ac vertical information; and
e) sub-bands containing high order ac horizontal and ac vertical information.

The concealment methods used in the different categories can be tailored to the properties, and relative importance to the final reconstructed picture, of the data in that category of sub-bands. For example, concealment in the vertical dc sub-bands should concentrate on the predominance of vertical features in these sub-bands. The different concealment techniques used will be discussed in detail below.

FIG. 8 is a high-level flow chart showing the operation of an error concealment apparatus for use with sub-band coded images. At a step 500 the apparatus initiates concealment of a corrupted data element in one of the sub-bands of an image. Three checks are then performed. At a step 510 the frequency range of the sub-band containing the error is determined; at a step 520 elements in the previous and subsequent frames corresponding to the corrupted element are checked for error; and at a step 530 elements in the same sub-band surrounding the corrupted element are themselves checked for errors. A concealment method is then selected at a step 540 based on predetermined criteria relating to the results of tests performed at the steps 510, 520 and 530. The concealment method is in fact selected from a predetermined strategy or set of concealment methods arranged in an ordered list according to their predicted results on the quality of the concealed image. The use of these ordered sets will be described further below. Finally at a step 550 the error is concealed using the selected method.

FIG. 9 shows the concealment strategies appropriate for the different classes of sub-band shown in FIG. 7. The strategies are shown as sets or lists arranged in a predetermined selection order, in that as far as is possible the concealment method at the top of the list (highest in the predetermined selection order) will be used. If the error rate is such that this first option cannot be applied then the second method in the list will be used, and so on. For example, the preferred method of concealing an error in the dc sub-band is frame concealment. However (as described below), frame concealment requires that certain data elements in the previous and next frame are error-free. If this is not the case then the next preferred method is a type of spatial error concealment which only requires error-free elements in the same frame as the error to be corrected. However, if this cannot be performed then the next preferred option will be used and so on, progressing down through the predetermined selection order.

The various types of error concealment shown in FIG. 9 will now be described with reference to FIGS. 10 to 15.

FIG. 10 is a schematic illustration of frame concealment, in which a corrupted data element 585 in one of the sub-bands is concealed by replacing the corrupted element by a value interpolated between corresponding elements in adjacent (previous and subsequent) frames 570, 590. In order for this technique to be useful two conditions must be met. The first condition is that the two corresponding elements 575, 595 must be error-free. The second condition relates to motion of the image between the previous and next frames. If the difference between the two corresponding elements 575, 595 is larger than a predetermined amount then it is likely that the picture has changed substantially over this period and an interpolation would be meaningless. In these circumstances the next method in the set according to the predetermined selection order would be considered for use.

FIG. 11 illustrates a suitable apparatus 600 for performing frame concealment. It is convenient to interpolate a replacement value, and to calculate the difference between the corresponding elements in the previous and next frames, for each element in each sub-band, whether or not that element is corrupted. However, the action of an output multiplexer 620 is to ignore the interpolated value if the current element is error-free.

A data element presented at the input to the apparatus is passed to the first of two single-frame delay units 605, 610. An interpolator 650 interpolates between the data element currently at the input to the apparatus and a corresponding element which has been subject to a two-frame delay in the delay units 605, 610, passing the resulting interpolated value to the multiplexer 620. At the same time a subtracter 630 determines the numerical difference between the value of the data element currently at the input to the apparatus and the corresponding element which has been delayed by two frames, passing its result to a threshold measurement and error flag analysis unit 640.

The threshold measurement and error flag analysis unit 640 determines whether the interpolated value calculated by the interpolator 650 should be substituted for the present value of the data at the output 615 of the delay unit 605. To make this decision the threshold measurement and error flag analysis unit 640 receives the error flags indicating the validity of data elements received by the apparatus, and the output of the subtracter 630. As mentioned above, three conditions must be met in order for the interpolated value to be used instead of the existing value:

a) the existing value must be in error;

b) the corresponding elements in the previous and next frames must be valid (error-free); and c) the difference between the corresponding elements (as calculated by the subtracter 630) must be less than a predetermined threshold.

If these three conditions are met the threshold measurement and error flag analysis unit 640 sets a 'substitute' input 625 on the multiplexer 620 to 'true', thereby instructing the multiplexer to substitute the interpolated value for the existing value of the data element at the input to the multiplexer.

If the above three conditions are not all met (usually because the current data element is error-free), then data elements input to the apparatus are subject to a single frame of delay and then fed from the output 615 of the delay unit 605, and via the multiplexer 620, to the output of the apparatus.

The threshold level used by the threshold measurement and error flag analysis unit 640 varies according to the spatial frequency range of the sub-band containing the corrupted element. This is because the different sub-bands have varying sensitivity to motion in the original image data and varying influence on the reconstructed picture.

Various techniques for spatial concealment will now be described with reference to FIGS. 12(a) to 12(d). In each case a replacement value for a corrupted element 680 is interpolated from surrounding error-free elements in the same sub-band which are weighted with appropriate interpolation coefficients.

Figure 12A:
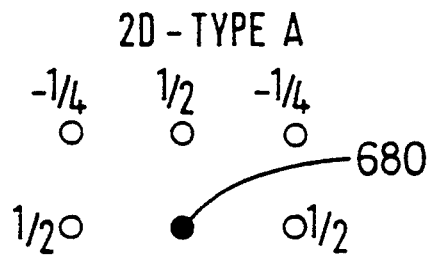
FIGS. 12A, 12B, 12C and 12D illustrate four types of spatial concealment.

FIG. 12A shows a first type (type A) of two-dimensional spatial concealment in which the replacement value is dependant upon all of the eight elements surrounding (adjacent to) the corrupted data element. A weighted average of the adjacent elements is produced, in which the replacement value equals one half of the sum of values of the horizontally and vertically adjacent elements, minus one quarter of the sum of the values of the diagonally adjacent elements. The actual weighting values applied to each adjacent element are shown in superscript next to the elements in FIGS. 12A, 12B, 12C and 12D. It will be seen that in each case the sum of all the weighting values is normalised to one.

Figure 12B:
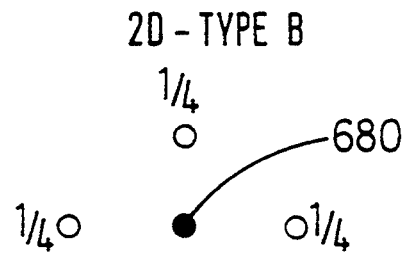

In FIG. 12B a second type (type B) of two dimensional spatial concealment is shown. In this case the elements displaced diagonally from the corrupted element are ignored, and the remaining elements are summed in equal proportions with weighting values of one quarter.

Figure 12C:
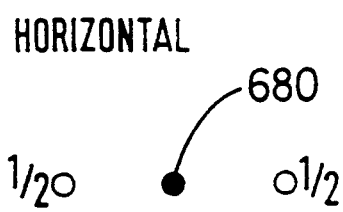
Figure 12D:
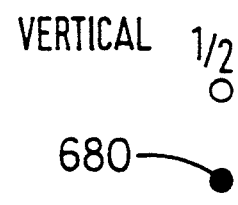

FIGS. 12C and 12D show one dimensional interpolation in the horizontal and vertical directions respectively. In each case the replacement value is a linear interpolation between the elements on either side of the corrupted element, which are summed with weighting values of one half.

The significance of the different spatial concealment methods shown in FIGS. 12A to 12D will be apparent if these figures are viewed in conjunction with FIGS. 6(a), 6(b) and 9. For example, it will be seen from the table in FIG. 9 that for the horizontal dc sub-bands (those in the leftmost column in FIG. 6(b)) the preferred method of spatial concealment is the horizontal concealment method shown schematically in FIG. 12C. This selection takes advantage of the predominance of horizontal features in that category of sub-bands. Similarly, the preferred concealment method for the vertical dc sub-bands is vertical concealment as shown in FIG. 12D. Accordingly, the spatial concealment method used in a particular sub-band can make use of the fact that the difference between adjacent elements in that sub-band in one or both directions is likely to be small.

Figure 13:
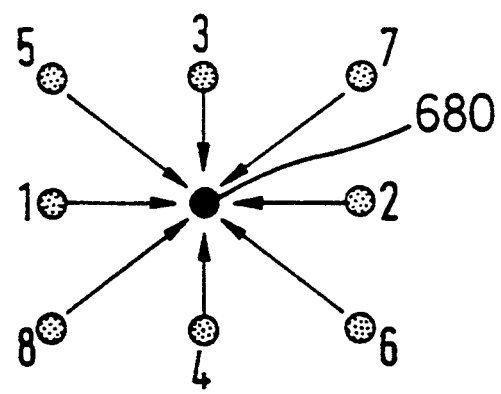
FIG. 13 illustrates spatial replacement.

FIG. 13 illustrates spatial replacement of a corrupted data element 680. If there are insufficient error free elements surrounding the corrupted element to interpolate a replacement value then that element can be replaced by a single one of the surrounding elements selected according to a predetermined order of priority. The order of priority is pre-arranged so that the element used for spatial replacement is likely to bear a reasonable relationship to the original (uncorrupted) value of the corrupted element. The order of priority is shown on the figure by numbers in superscript next to the surrounding elements.

Figure 14:
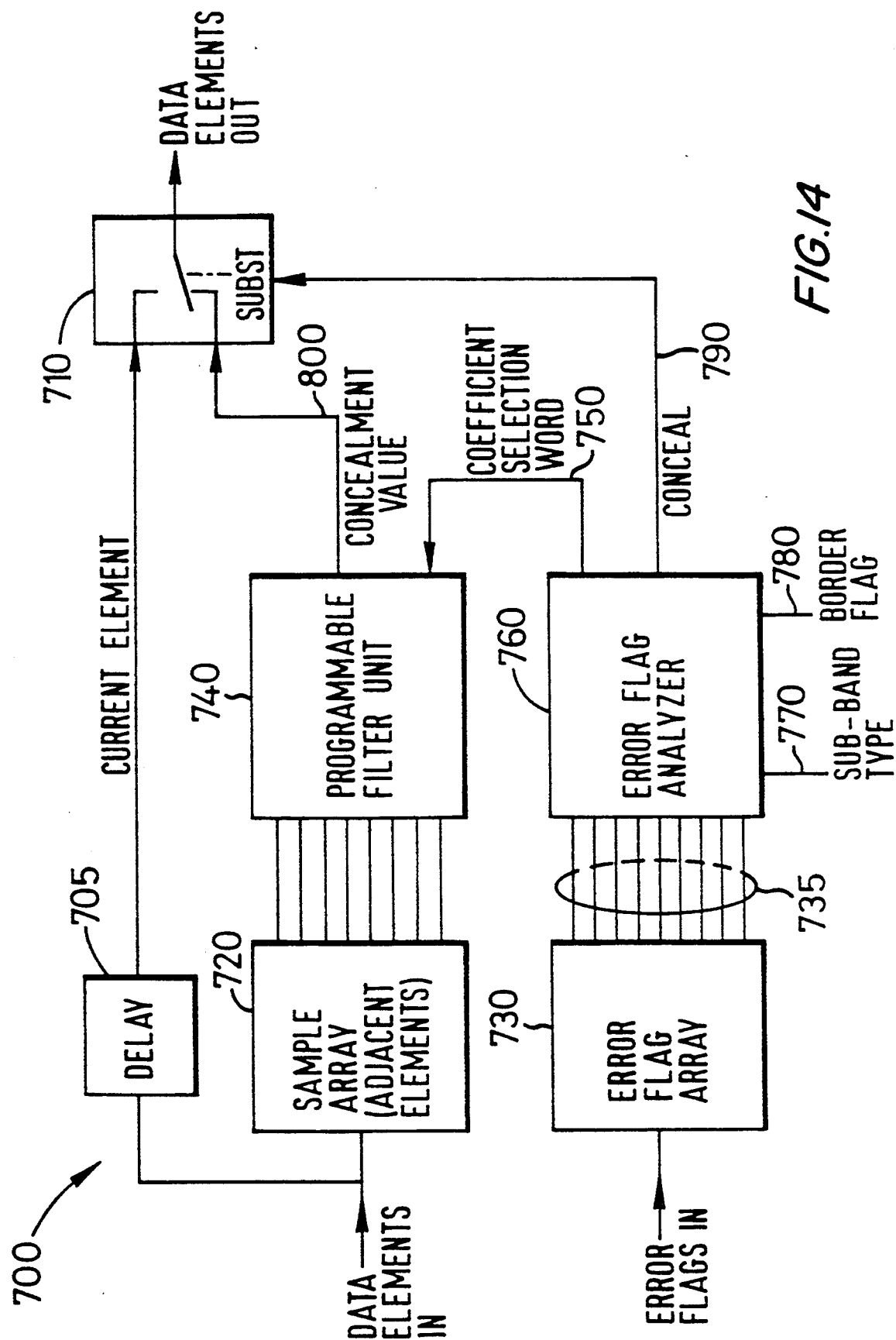
FIG. 14 illustrates spatial concealment and replacement apparatus.

FIG. 14 illustrates a suitable apparatus 700 for performing spatial concealment and spatial replacement of a corrupted data element. Each element in turn in a sub-band is fed to the input of the apparatus, from where it is passed to a delay unit 705. The delay imposed by the delay unit 705 is arranged to be substantially equal to the propagation delay of the remainder of the circuit. From the delay unit 705 the element is passed to a multiplexer 710, to be described further below.

At the same time as a current element is fed to the delay unit 705, the eight surrounding elements from the same sub-band are stored in a sample array 720 and the error flags corresponding to the current element and the eight surrounding elements are stored in an error flag array 730. The elements stored in the sample array 720 are applied as inputs to a programmable filter unit 740 which combines these elements together in a weighted sum using a selected one of a plurality of pre-programmed sets of weighting coefficients. The particular set of coefficients selected depends on a multi-bit coefficient selection word 750 provided by an error flag analyzer 760.

The error flag analyzer 760 is effectively a look-up table, and in fact is implemented using a programmable read only memory (PROM). Its inputs are the nine error flags 735 for the current element and the eight elements surrounding the current element in the spatial frequency domain, a multi-bit word 770 indicating the sub-band type of the current element, and a border flag 780 indicating whether the current element is at a top or bottom horizontal edge, a left or right vertical edge or a combination of a horizontal and a vertical edge (a corner) of the sub-band. Based on this input information the error flag analyzer 760 supplies two outputs: a multi-bit coefficient selection word 750 for controlling the programmable filter unit 740, and a single concealment flag 790 indicating whether or not the current element should be concealed. For each permutation of inputs 735, 770, 780 (which may be considered as the address inputs to a PROM), the error flag analyzer 760 provides corresponding preprogrammed outputs 750, 790 (which may be considered as the data output from the PROM).

The concealment flag 790 controls the multiplexer 710 to pass either the existing value of the current element or a concealment value 800 calculated by the programmable filter unit 740.

The border flag 780 is necessary because an element at the edge of a sub-band will not have eight nearest neighbour elements from which a concealment value can be calculated. This contingency is handled by the error flag analyzer 760, which is responsive to the border flag, selecting an appropriately modified set of interpolation coefficients in which the concealment value is dependant only on the available surrounding elements in the same sub-band.

FIGS. 15A-E schematically illustrates the selection of concealment coefficients by the programmable filter unit 740 and the error flag analyzer 760. Five example situations are respectively therein shown along with the coefficients used by the programmable filter unit 740 to calculate a concealment value 800, in response to the coefficient selection word 750 supplied by the error flag analyzer 760.

In each of the situations shown in FIGS. 15A-E one of the concealment strategies shown in FIG. 9 is applied in the predetermined selection order, with the strategy used depending on frequency range of the sub-band containing the corrupted element. Since the purpose of FIGS. 15A-E is to illustrate the operation of the spatial concealment apparatus 700, it is assumed in each of the FIGS. 15A-E that frame concealment is not possible because of corrupted elements in the adjacent frames or because of excessive inter-frame motion.

For each example situation there are shown schematic representations of the inputs supplied to the error flag analyzer 760, namely: the error flags 730 corresponding to the current element and its eight nearest neighbours; the border flag 780 which specifies whether the current element is at a horizontal or vertical edge of its sub-band; and the sub-band type 770. As described above, in response to these inputs the error flag analyzer 760 supplies two outputs, namely: a coefficient selection word 750 supplied to the programmable filter unit 740; and a concealment flag 790 supplied to the multiplexer 710.

In response to the coefficient selection word 750, the programmable filter unit 740 selects one of a plurality of sets of pre-programmed interpolation coefficients. For the present description the coefficient selection words 750 have not been shown on FIGS. 15A-E, since these are only used for internal signalling within the spatial concealment apparatus 700. However, in FIGS. 15A-E the actual interpolation coefficients used by the programmable filter unit in response to the coefficient selection word 750 supplied by the error flag analyzer are shown, along with the value of the concealment flag 790 generated by the error flag analyzer 760 and supplied to the multiplexer 710.

Figure 15A:
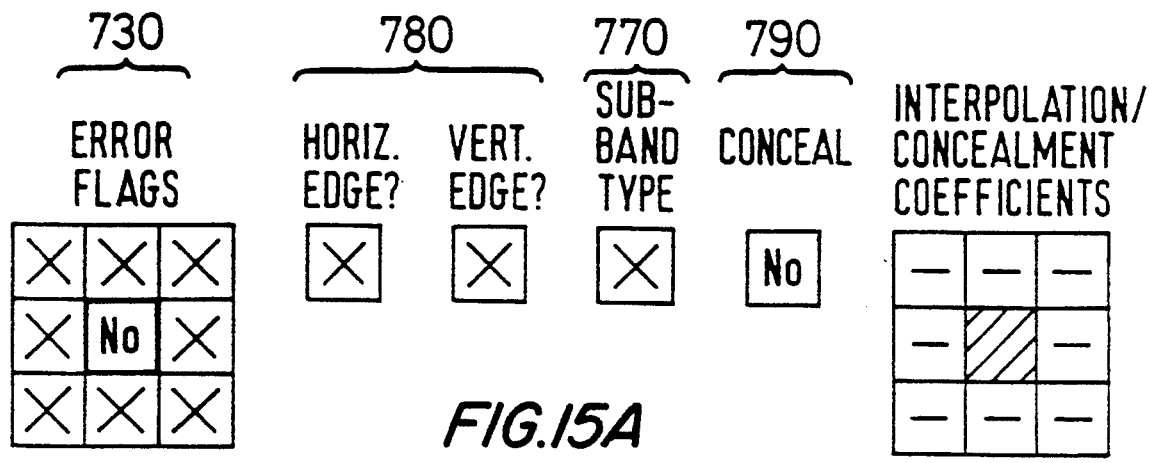
FIGS. 15A, 15B, 15C, 15D and 15E are schematic illustrations showing the selection of concealment coefficients by the apparatus of FIG. 14.

In FIG. 15A, the error flag corresponding to the current element (shown in the centre of the schematic array of error flags) is set to 'No' (no error). Concealment is not required, so the concealment flag 790 is also set to 'No' by the error flag analyzer. In these circumstances the sub-band type and the state of the surrounding error flags and the border flags are immaterial (indicated by an 'X' (don't care)), in that concealment will never be used if the current element is not in error.

Figure 15B:
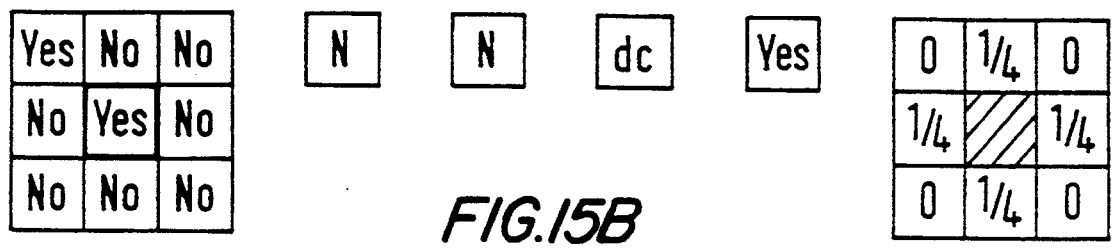

FIG. 15B represents spatial concealment in the horizontal and vertical dc sub-band (sub-band 0). One of the error flags diagonally adjacent to the current element is set to 'Yes' (error), so type-B two-dimensional concealment dependant upon the horizontally and vertically adjacent elements is used. The concealment coefficients used correspond to those shown in FIG. 12B. Concealment is required so the concealment flag 790 is set to 'Yes'.

Figure 15C:
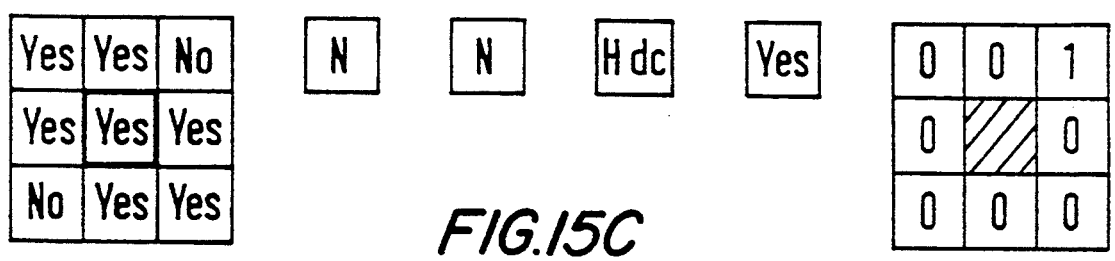

In FIG. 15C one of the dc horizontal sub-bands contains an error. However, spatial concealment using interpolation between horizontally adjacent elements is not appropriate because those elements themselves are in error, as shown by the error flags 730. Accordingly spatial replacement is used. The current element is replaced by one of the surrounding elements selected according to the predetermined order described above in relation to FIG. 13. Concealment is required, so the concealment flag 790 is set by the error flag analyzer to 'Yes'.

Figure 15D:
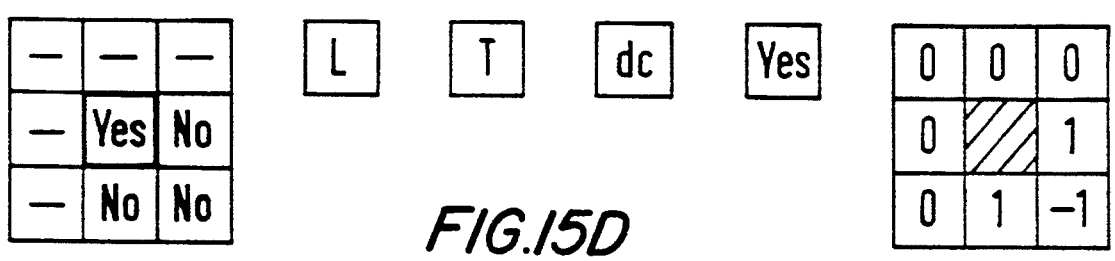

FIG. 15D shows spatial concealment in the case of an element at the top left corner of sub-band 0 (the horizontal and vertical dc sub-band). There are no elements above and to the left of the current element, so a replacement value is interpolated from those elements below and to the right of the current element. Again, concealment is required, so the concealment flag 790 is set to 'Yes'.

Figure 15E:
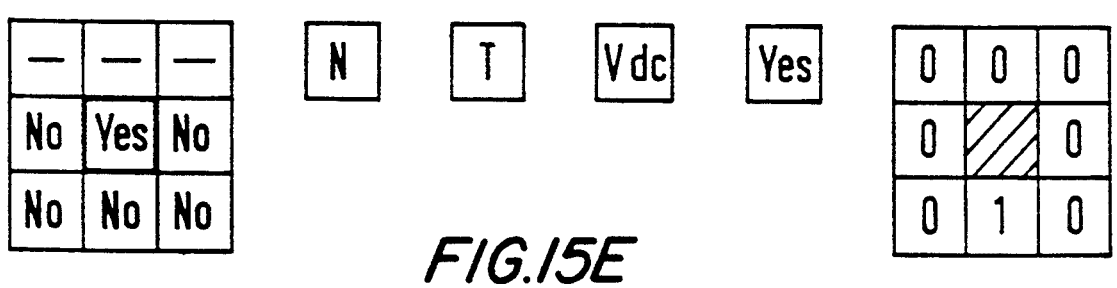

Finally, FIG. 15E shows the use of spatial concealment for an element at the top edge of a vertical dc sub-band. There is no element above the current element, so effectively the element is replaced by the adjacent element from below. Concealment is required, so the concealment flag 790 is set to 'Yes'.

For the sub-bands containing ac horizontal and ac vertical information, zero substitution may be used, in which all of the interpolation coefficients are set to zero in response to the coefficient selection word 750. Zero substitution is used if frame concealment is not possible and, in the case of the high order ac sub-bands shown on FIGS. 7 and 9, is used regardless of the state of the surrounding error flags. For the low order ac sub-bands shown on FIGS. 7 and 9 zero substitution is used unless all eight surrounding elements are in error.

A further concealment method is frame replacement which involves the re-use of the existing value of a sub-band element for which a concealment value cannot be calculated. It is used if all eight surrounding elements are in error (except in the case of high order ac sub-bands as described above) and is a 'last resort' since in serious error conditions a particular element may have to be re-used for an indeterminate number of frames. Ultimately, frame replacement provides a 'picture hold' facility when the data errors reach 100% (for example at the end of transmission or when reading from a storage medium stops). It is not desirable to use frame replacement for concealment of corrupted elements in ac sub-bands above a predetermined horizontal frequency and a predetermined vertical frequency. This is because these high frequency sub-bands often assume lowest priority in coding and recording (or transmission), and in fact may be discarded if a coding overrun is suffered. Accordingly if frame replacement were used for these sub-bands a corrupted element could be replaced by a corresponding element which was many frames old. This would lead to persistent high spatial frequency patterning on the reconstructed images.

Figure 16:
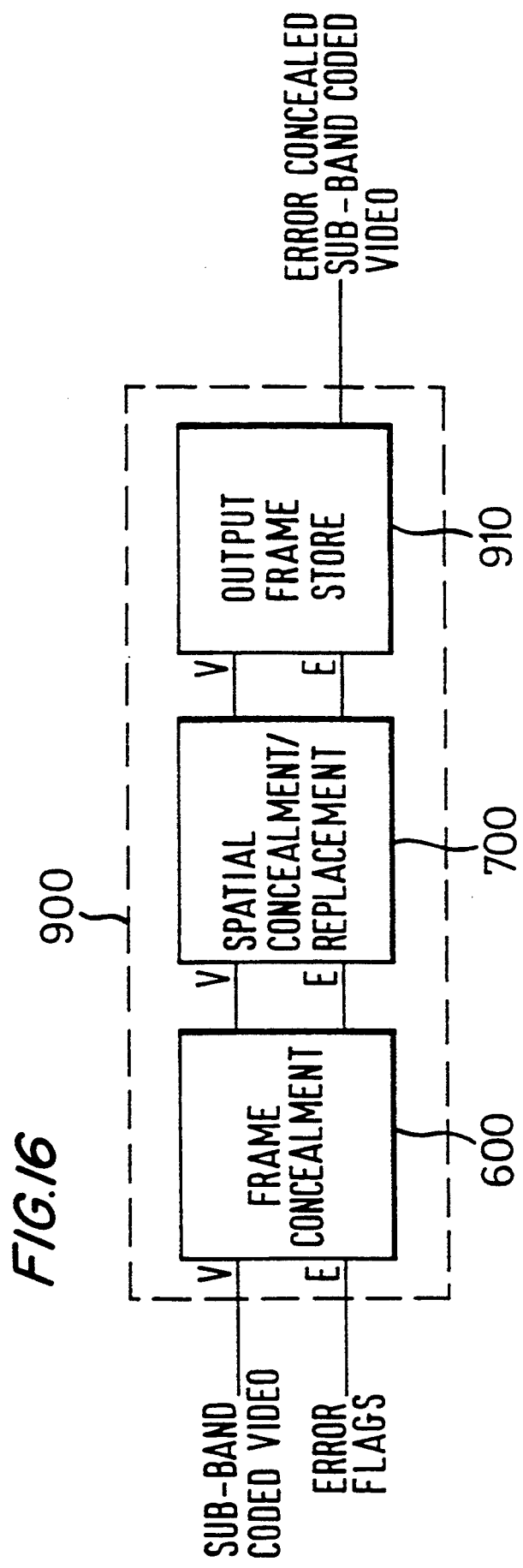
FIG. 16 illustrates an overall block diagram of an error concealment apparatus.

FIG. 16 shows an overall block diagram of a concealment apparatus 900 for use with sub-band coded video data. A corrupted input digital video signal and the corresponding error flags are first passed to the frame concealment apparatus 600, as described above in connection with FIG. 11. It will be assumed that the signal contains at least one uncorrectable error. If possible, the frame concealment apparatus 600 conceals a corrupted data element and resets the error flag associated with that element. If frame concealment is not possible then the spatial concealment and replacement apparatus 700 described above in connection with FIG. 14 attempts to conceal the error. If the spatial concealment and replacement apparatus 700 does conceal a corrupted data element it resets the error flag associated with that element. However, if this is not possible (for example, because all of the elements adjacent to the element in error are themselves corrupted), then a last resort is to use frame replacement in which the value of that element currently held in an output frame store 910 is re-used and is not replaced by the corrupted value.

Although the embodiment of the invention described above has been implemented predominantly in hardware, it will be clear to the skilled man that the same function could be achieved using suitable software running on a general purpose computer.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Error concealment apparatus for concealing corrupted data elements in digital image data having a plurality of elements representing respective spatial frequency components of a frequency separated image in a two-dimensional spatial frequency domain, said error concealment apparatus comprising:
    (i) a plurality of error concealment means; and
    (ii) selecting means for selecting one of said error concealment means to conceal a corrupted data element according to said spatial frequency component represented by said corrupted data element.

2. Error concealment apparatus according to claim 1, wherein said apparatus is used with a digital video recording/reproducing device.

3. Error concealment apparatus according to claim 1, wherein said apparatus is used with a digital video transmission/reception device.

4. A method of concealing a corrupted data element in digital image data having a plurality of elements representing respective spatial frequency components of a frequency separated image in a two-dimensional spatial frequency domain, said method comprising selecting one of a plurality of error concealment means to conceal said corrupted data element according to said spatial frequency component represented by said corrupted data element.

5. Error concealment apparatus for concealing corrupted data elements in digital image data comprising a plurality of elements representing respective sub-bands of a frequency separated image in a two-dimensional spatial frequency domain, each of said sub-bands representing a respective spatial frequency range, said error concealment apparatus comprising:
    a plurality of error concealment means; and
    selecting means for selecting one of said error concealment means to conceal one of said corrupted data elements according to said spatial frequency range of the sub-band containing the corrupted data element.

6. Error concealment apparatus according to claim 5, in which said digital image data comprises a series of frames of data representing respective successive frames of a video signal.

7. Error concealment apparatus according to claim 6, in which one of said error concealment means comprises frame replacement means for replacing said corrupted data element by a value of a corresponding element in a previous frame.

8. Error concealment apparatus according to claim 6, in which one of said error concealment means comprises frame concealment means for interpolating a replacement value for said corrupted data element from corresponding elements in frames adjacent to a frame containing said corrupted element.

9. Error concealment apparatus according to claim 8, in which each of said elements has an element value, and in which said frame concealment means further comprises:
   means for calculating a difference value representing a numerical difference between said element values of said corresponding elements in said adjacent frames; and
   means for preventing operation of said frame concealment means if said difference value is greater than a predetermined threshold.

10. Error concealment apparatus according to claim 9, in which said predetermined threshold varies according to said spatial frequency range of said sub-band containing said corrupted data element.

11. Error concealment apparatus according to claim 8, in which said selecting means selects one of said error concealment means from a predetermined set of said error concealment means, said set varying according to said spatial frequency represented by said corrupted data element.

12. Error concealment apparatus according to claim 11, in which said selecting means comprises means for selecting an error concealment means within said set which is highest in a predetermined selection order associated with said set and for which all elements required by said error concealment means to interpolate a replacement value for said corrupted data element are error-free.

13. Error concealment apparatus according to claim 12, in which said predetermined set of said error concealment means for said sub-band containing dc horizontal and dc vertical information comprises, in said predetermined selection order:
   (1) said frame concealment means;
   (2) first two-dimensional spatial concealment means for interpolating a replacement value for said corrupted data element from all of said elements adjacent in the two-dimensional spatial frequency domain to said corrupted data element in said frequency separated image data;
   (3) second two-dimensional spatial concealment means for interpolating a replacement value for said corrupted data element from elements which are horizontally adjacent in the two-dimensional spatial frequency domain and elements which are vertically adjacent in the two-dimensional spatial frequency domain to said corrupted data element in said frequency separated image data;
   (4) horizontal spatial concealment means for interpolating a replacement value for said corrupted data element from elements horizontally adjacent in the two-dimensional spatial frequency domain to said corrupted data element in said frequency separated image data;
   (5) vertical spatial concealment means for interpolating a replacement value for said corrupted data element from elements vertically adjacent in the two-dimensional spatial frequency domain to said corrupted data element in said frequency separated image data;
   (6) spatial replacement means for replacing said corrupted data element by a value of a single other element adjacent in the two-dimensional spatial frequency domain to said corrupted data element in said frequency separated image data; and
   (7) frame replacement means for replacing said corrupted data element by a value of a corresponding element in a previous frame.

14. Error concealment apparatus according to claim 12, in which said predetermined set of said error concealment means for sub-bands containing dc horizontal and ac vertical information comprises, in said predetermined selection order:
   (1) said frame concealment means;
   (2) horizontal spatial concealment means for interpolating a replacement value for said corrupted data element from elements horizontally adjacent in the two-dimensional spatial frequency domain to said corrupted data element in said frequency separated image data;
   (3) spatial replacement means for replacing said corrupted data element by a value of a single other element adjacent in the two-dimensional spatial frequency domain to said corrupted data element in said frequency separated image data; and
   (4) frame replacement means for replacing said corrupted data element by a value of a corresponding element in a previous frame.

15. Error concealment apparatus according to claim 12, in which said predetermined set of said error concealment means for sub-bands containing ac horizontal and dc vertical information comprises, in said predetermined selection order:
   (1) said frame concealment means;
   (2) vertical spatial concealment means for interpolating a replacement value for said corrupted data element from elements vertically adjacent in the two-dimensional spatial frequency domain to said corrupted data element in said frequency separated image data;
   (3) horizontal spatial concealment means for interpolating a replacement value for said corrupted data element from elements horizontally adjacent in the two-dimensional spatial frequency domain to said corrupted data element in said frequency separated image data;
   (4) spatial replacement means for replacing said corrupted data element by a value of a single other element adjacent in the two-dimensional spatial frequency domain to said corrupted data element in said frequency separated image data; and
   (5) frame replacement means for replacing said corrupted data element by a value of a corresponding element in a previous frame.

16. Error concealment apparatus according to claim 12, in which said predetermined set of said error concealment means for sub-bands containing ac horizontal and ac vertical information comprises, in said predetermined selection order:
   (1) said frame concealment means; and
   (2) constant substitution means for replacing said corrupted data element by a predetermined constant value.

17. Error concealment apparatus according to claim 16, in which said predetermined set of said error concealment means for sub-bands containing ac horizontal information below a predetermined horizontal spatial frequency and ac vertical information below a predetermined vertical spatial frequency further comprises, in said predetermined selection order:

(3) frame replacement means for replacing said corrupted data element by a value of a corresponding element in a previous frame; said frame concealment means being selected if none of said elements adjacent in the two dimensional spatial frequency domain to said corrupted data element in said frequency separated image data is error-free.

18. Error concealment apparatus for concealing corrupted data elements in digital image data comprising a plurality of elements representing respective spatial frequency components of a frequency separated image in a two-dimensional spatial frequency domain, said error concealment apparatus comprising:

a plurality of error concealment means, in which one of said error concealment means comprises two-dimensional spatial concealment means for interpolating a replacement value for a corrupted data element from all of said elements adjacent in the two-dimensional spatial frequency domain to said corrupted data element in the frequency separated image data; and selecting means for selecting one of said error concealment means to conceal one of said corrupted data elements according to said spatial frequency component represented by said corrupted data element.

19. Error concealment apparatus according to claim 18, in which each of said elements has an associated error flag, and in which said apparatus further comprises programmable filter means for calculating a replacement value for said corrupted data element according to a weighted sum of the values of one or more elements adjacent in the two-dimensional spatial frequency domain to said corrupted data element in said frequency separated image data, using a group of weighting coefficients selected from a plurality of predetermined groups of weighting coefficients, said group of weighting coefficients being selected in a predetermined manner in response to said error flags associated with said adjacent elements.

20. Error concealment apparatus according to claim 18, wherein said frequency separated image data has one or more edges in the two dimensional spatial frequency domain, said apparatus further comprising:

edge detection means for detecting whether said corrupted data element is at one or more of said edges of said frequency separated image date in the two-dimensional spatial frequency domain, whereby only a subset of said adjacent elements is present; and means responsive to said edge detection means for controlling said selected error concealment means to replace said corrupted data element with a replacement value dependant on one or more of said subset of adjacent elements.

21. Error concealment apparatus according to claim 20, in which:

said digital image data represents respective sub-bands of said image in the two-dimensional spatial frequency domain, each of said sub-bands representing a respective spatial frequency range;

said selecting means selects one of said error concealment means to conceal said corrupted data element according to said spatial frequency range of said sub-band containing said corrupted data element;

each of said sub-bands has one or more edges in the two-dimensional spatial frequency domain; and said edge detection means comprises means for detecting whether said corrupted data element is at one or more of said edges of its respective sub-band in the two-dimensional spatial frequency domain.

22. Error concealment apparatus for concealing corrupted data elements in digital image data comprising a plurality of elements representing respective spatial frequency components of a frequency separated image in a two-dimensional spatial frequency domain, said error concealment apparatus comprising:

a plurality of error concealment means, in which one of said error concealment means comprises two-dimensional spatial concealment means for interpolating a replacement value for a corrupted data element from elements which are horizontally adjacent in the two-dimensional spatial frequency domain and elements which are vertically adjacent in the two-dimensional spatial frequency domain to said corrupted data element in the frequency separated image data; and selecting means for selecting one of said error concealment means to conceal one of said corrupted data elements according to said spatial frequency component represented by said corrupted data element.

23. Error concealment apparatus for concealing corrupted data elements in digital image data comprising a plurality of elements representing respective spatial frequency components of a frequency separated image in a two-dimensional spatial frequency domain, said error concealment apparatus comprising:

a plurality of error concealment means, in which one of said error concealment means comprises vertical spatial concealment means for interpolating a replacement value for a corrupted data element from elements vertically adjacent in the two-dimensional spatial frequency domain to said corrupted data element in the frequency separated image data; and selecting means for selecting one of said error concealment means to conceal one of said corrupted data elements according to said spatial frequency component represented by said corrupted data element.

24. Error concealment apparatus for concealing corrupted data elements in digital image data comprising a plurality of elements representing respective spatial frequency components of a frequency separated image in a two-dimensional spatial frequency domain, said error concealment apparatus comprising:

a plurality of error concealment means, in which one of said error concealment means comprises horizontal spatial concealment means for interpolating a replacement value for a corrupted data element from elements horizontally adjacent in the two-dimensional spatial frequency domain to said corrupted data element in the frequency separated image data; and selecting means for selecting one of said error concealment means to conceal one of said corrupted data elements according to said spatial frequency component represented by said corrupted data element.

25. Error concealment apparatus for concealing corrupted data elements in digital image data comprising a plurality of elements representing respective spatial frequency components of a frequency separated image in a two-dimensional spatial frequency domain, said error concealment apparatus comprising:

a plurality of error concealment means, in which one of said error concealment means comprises spatial replacement means for replacing a corrupted data element by a value of a single other element adjacent in the two-dimensional spatial frequency domain to said corrupted data element in the frequency separated image data; and selecting means for selecting one of said error concealment means to conceal one of said corrupted data elements according to said spatial frequency component represented by said corrupted data element.

26. Error concealment apparatus according to claim 25, in which said spatial replacement means comprises means for replacing said corrupted data element by an adjacent element which is highest in a predetermined selection order and which is error-free.

27. Error concealment apparatus for concealing corrupted data elements in digital image data comprising a plurality of elements representing respective spatial frequency components of a frequency separated image in a two-dimensional spatial frequency domain, said error concealment apparatus comprising:

a plurality of error concealment means, in which one of said error concealment means comprises constant substitution means for replacing a corrupted data element by a predetermined constant value; and selecting means for selecting one of said error concealment means to conceal one of said corrupted data elements according to said spatial frequency component represented by said corrupted data element.

* * * * *